(12) United States Patent
Huang

(10) Patent No.: US 9,463,582 B2
(45) Date of Patent: Oct. 11, 2016

(54) SECURING STRUCTURE FOR LIGHT EMITTING ELEMENT AT SURFACE OF SHELL-LIKE ACCESSORY AND MANUFACTURING METHOD FOR THE SAME

(71) Applicant: Chi-Ping Huang, Taipei (TW)

(72) Inventor: Chi-Ping Huang, Taipei (TW)

( * ) Notice: Subject to any disclaimer, the term of this patent is extended or adjusted under 35 U.S.C. 154(b) by 179 days.

(21) Appl. No.: 14/543,609

(22) Filed: Nov. 17, 2014

(65) Prior Publication Data

US 2016/0138785 A1    May 19, 2016

(51) Int. Cl.
*B29C 33/00* (2006.01)
*F21V 33/00* (2006.01)
*B44C 5/00* (2006.01)

(52) U.S. Cl.
CPC ....... *B29C 33/00* (2013.01); *B44C 5/00* (2013.01)

(58) Field of Classification Search
CPC ..... B29C 33/00; B44C 5/005; B44C 5/0453; B44C 5/08; F21V 33/0004; F21V 33/0038; F21V 15/01; F21V 15/013; F21V 17/04; F21V 3/0436

See application file for complete search history.

(56) References Cited

U.S. PATENT DOCUMENTS

| | | | | |
|---|---|---|---|---|
| 2,781,597 | A * | 2/1957 | Doane ..................... | B44C 5/005 264/247 |
| 6,030,104 | A * | 2/2000 | Shu ......................... | B60Q 1/32 362/191 |
| 2006/0083015 | A1 * | 4/2006 | Yamazaki ............. | B44C 5/0453 362/540 |

FOREIGN PATENT DOCUMENTS

TW          FR 2874418 A3 *    2/2006    ............. B44C 5/005

* cited by examiner

*Primary Examiner* — Anh Mai
*Assistant Examiner* — Nathaniel Lee
(74) *Attorney, Agent, or Firm* — Muncy, Geissler, Olds & Lowe, P.C.

(57) ABSTRACT

A securing structure for a light emitting element at a surface of a shell-like accessory and a manufacturing method for the securing structure are provided. According to an appearance of a handmade accessory, a mold, a positioning tenon and an adapter body are provided. The adapter body is supported and secured by combining the positioning tenon at the mold. With repeated applying operations, a plastic cementing agent is applied at an outer round surface of the adapter body to provide a combining effect. The mold and the positioning tenon are removed after the plastic cementing agent is set and shaped. Thus, using an axis and structure support of the adapter body, the light emitting grain installed is capable of securing an angular position of its optical axis as well as enhancing the combining strength.

5 Claims, 12 Drawing Sheets

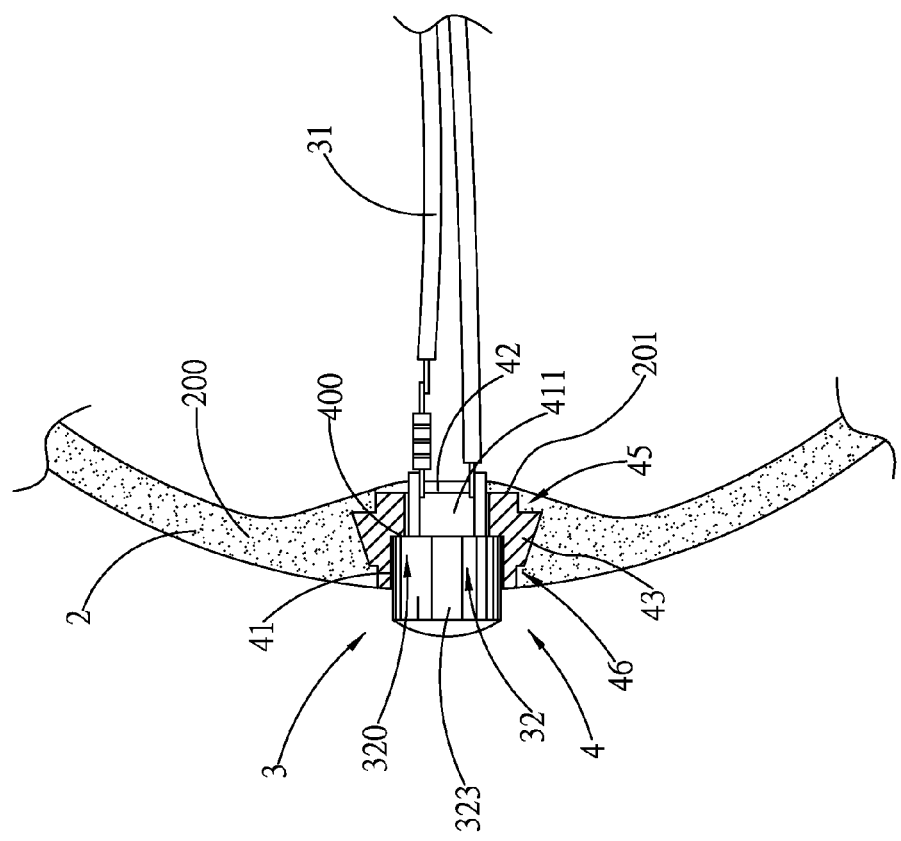
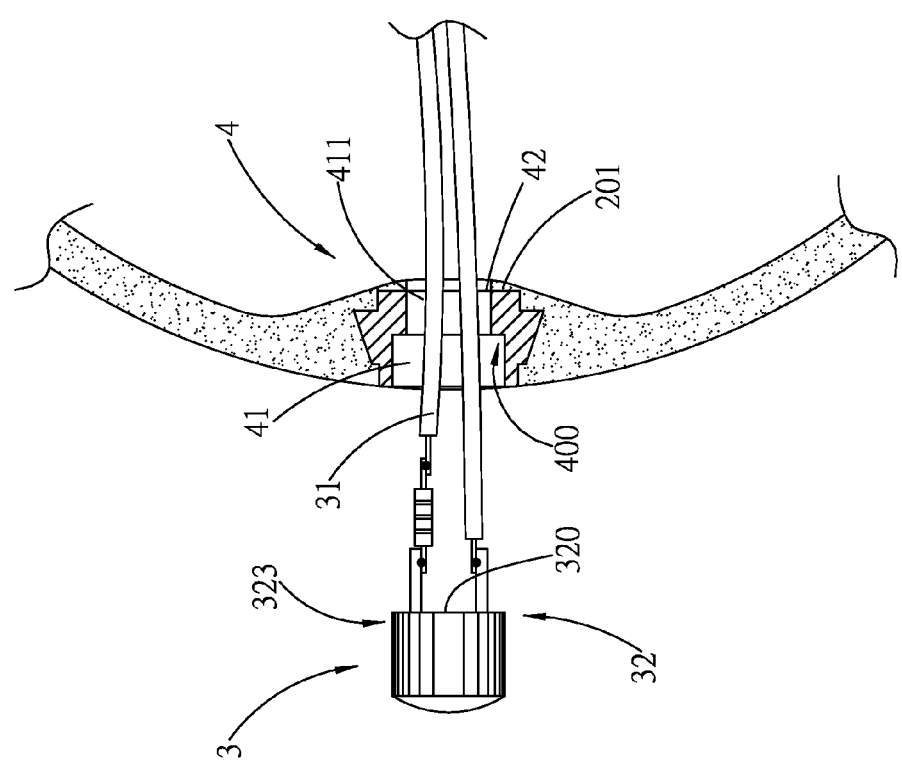

SECURING STRUCTURE FOR LIGHT EMITTING ELEMENT AT SURFACE OF SHELL-LIKE ACCESSORY AND MANUFACTURING METHOD FOR THE SAME

BACKGROUND OF THE INVENTION a) Field of the Invention

The invention relates in general to a handmade accessory, which allows a light emitting grain to be installed at precise angular positions at a surface of the handmade accessory and enhances binding forces between elements.

b) Description of the Prior Art

Sophisticated commercial fashion accessories are available in all diversities, including those that are large in size and handmade. For example, FIG. 1 shows a handmade accessory 1 having a shell-like housing 2. To form the shell-like housing 2, a plastic cementing agent is first manually applied at a surface of a mold and a fiber cloth is then covered thereon to yield a combined and solid structure. To enhance esthetic values of the surface of the handmade accessory 1, a light emitting grain 3 is installed to embellish the surface using a light beam from the light emitting grain 3.

In a conventional approach, at the surface of the handmade accessory 1, a hole 21 is provided at a position to be installed with the light emitting grain 3. The hole 21 can be penetrated by the light emitting grain 3, which is further secured by applying an adhesive 11 at a periphery of the hole 21.

In a manufacturing process, a mold is first provided according to an outer shape of the handmade accessory 1. A surface of the mold is applied with a plastic cementing agent, which is cured into the shell-like housing 2. The hole 21 is then formed on the shell-like housing 2 by using an electric drill, and is penetrated by and combined with a body of the light emitting grain 3. However, as the shell-like housing 2 is a thin shell body, a height of an inner wall of the hole 21 is extremely small such that an axis angle of the light emitting grain 3 cannot be supported. In addition, due to the thin material, the housing is liable to breakage caused by stress at a contact area of the housing.

As shown in FIG. 2, the handmade accessory 1 is provided with one single light emitting grain 3 having an optical axis 300. The overall functional esthetic values of the handmade accessory 1 may remain consistent and unaffected if the optical axis 300 is shifted. As shown in FIG. 3, to imitate a vehicle front of a vehicle, two light emitting grains 3 are provided to simulate vehicle headlights. It is possible that the two projected optical axis 300 be non-parallel and brightness levels of the two headlights be uneven, resulting in degraded functional esthetic values and realistic effects. Further, referring to FIG. 4 showing angles of the optical axis, when imitating an appearance of an animal, multiple light emitting grains 3 are provided around a neck of the animal. As shown in FIG. 4, the optical axis 300 of each of the light emitting grains 3 is perpendicular to a tangent of the surrounding curvature.

SUMMARY OF THE INVENTION

It is a primary object of the present invention to provide a securing structure for a light emitting element at a surface of a shell-like accessory and a manufacturing method for the provide a securing structure. The securing structure and manufacturing method of the present invention are capable of installing a light emitting grain at a precise angular position and providing a more reliable assembly structure.

To achieve the above object, in an embodiment of the present invention, a mold having a pick slot is utilized to assemble a positioning tenon. After having placed an adapter body, the shell-like housing is applied, and the mold and the positioning tenon are removed. Thus, the adapter body is secured at the shell-like housing in alignment, and provides a precise angular position for installing the light emitting grain.

To achieve the above object, in an embodiment of the present invention, a transpose hole is provided in the adapter body. Apart from allowing the shell-like housing to be positioned and temporarily assembled by the positioning tenon, the transpose hole provides the light emitting grain with a combining effect after finishing the shell-like housing.

The above and other aspects of the invention will become better understood with regard to the following detailed description of the preferred but non-limiting embodiments. The following description is made with reference to the accompanying drawings.

BRIEF DESCRIPTION OF THE DRAWINGS

FIG. 8 is a relationship diagram of a light emitting grain installed according to another embodiment of the present invention;

FIG. 9 is a schematic diagram of a light emitting grain combined according to another embodiment of the present invention;

DETAILED DESCRIPTION OF THE PREFERRED EMBODIMENTS

The above and other aspects of the invention will become better understood with regard to the following detailed description of the preferred but non-limiting embodiments. The following description is made with reference to the accompanying drawings.

Figure 1:
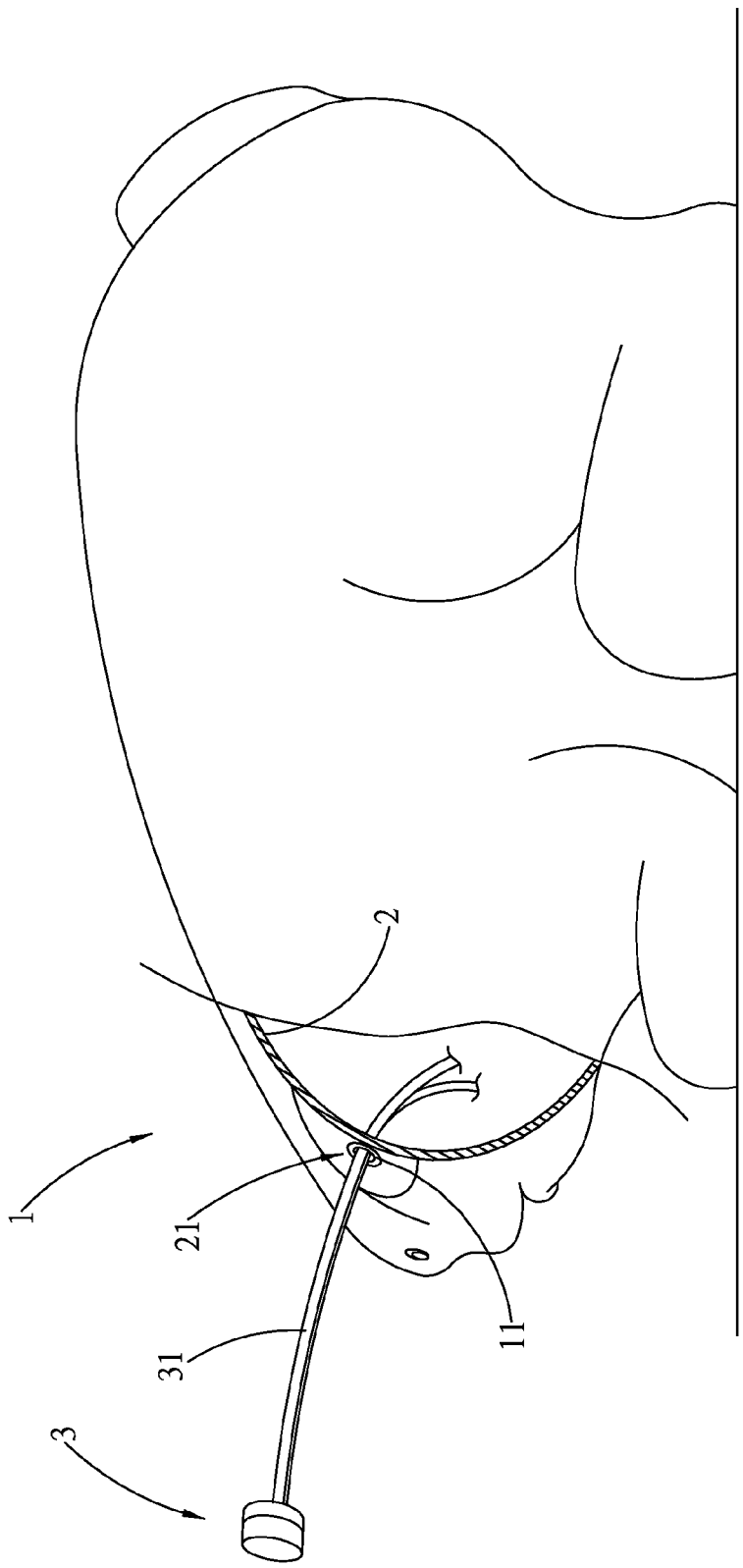
FIG. 1 is a schematic diagram of a structure of a conventional handmade accessory assembled with a light emitting grain.
Figure 2:
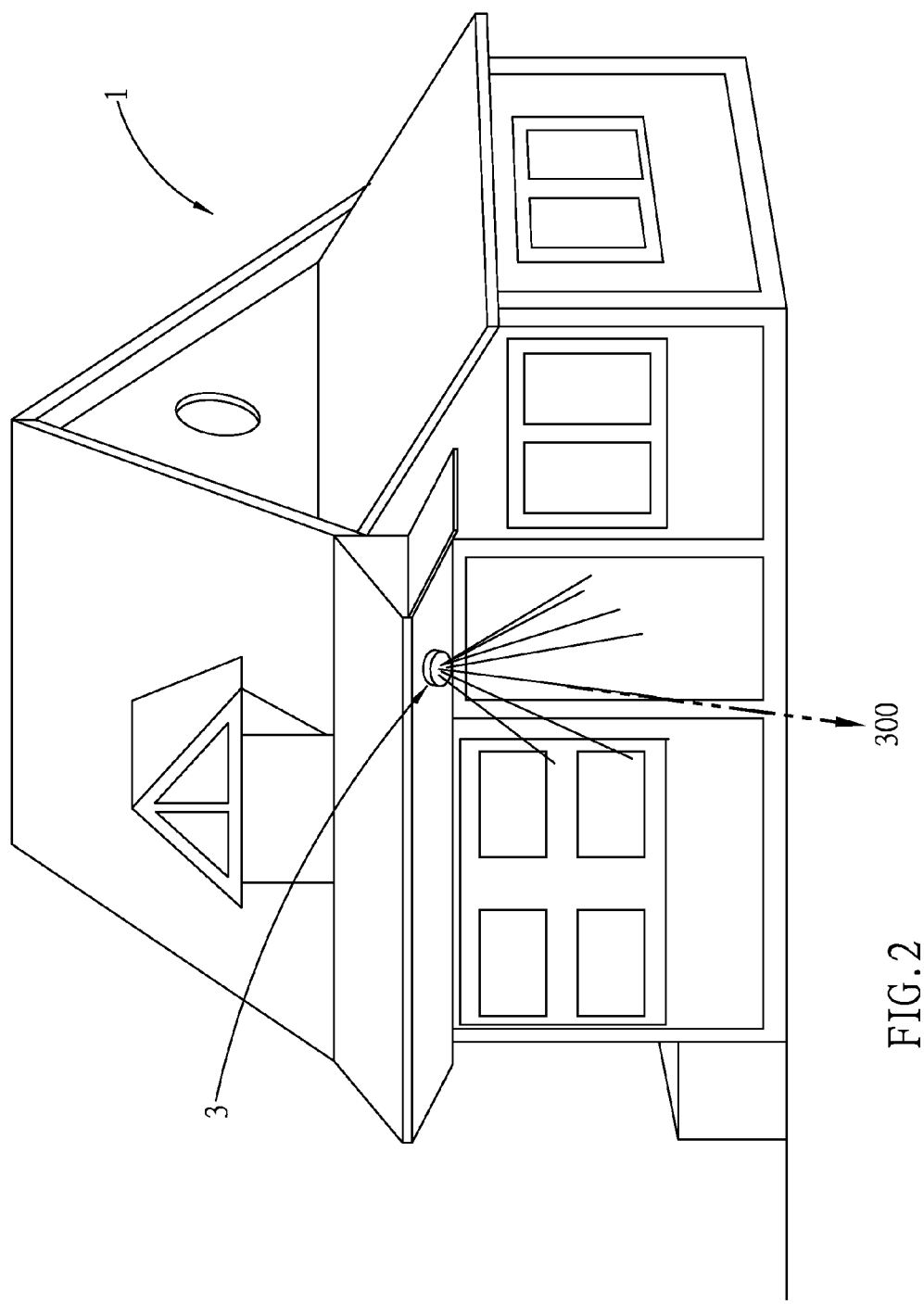
FIG. 2 is a diagram of a utilization state of a conventional handmade accessory assembled with a light emitting grain.
Figure 3:
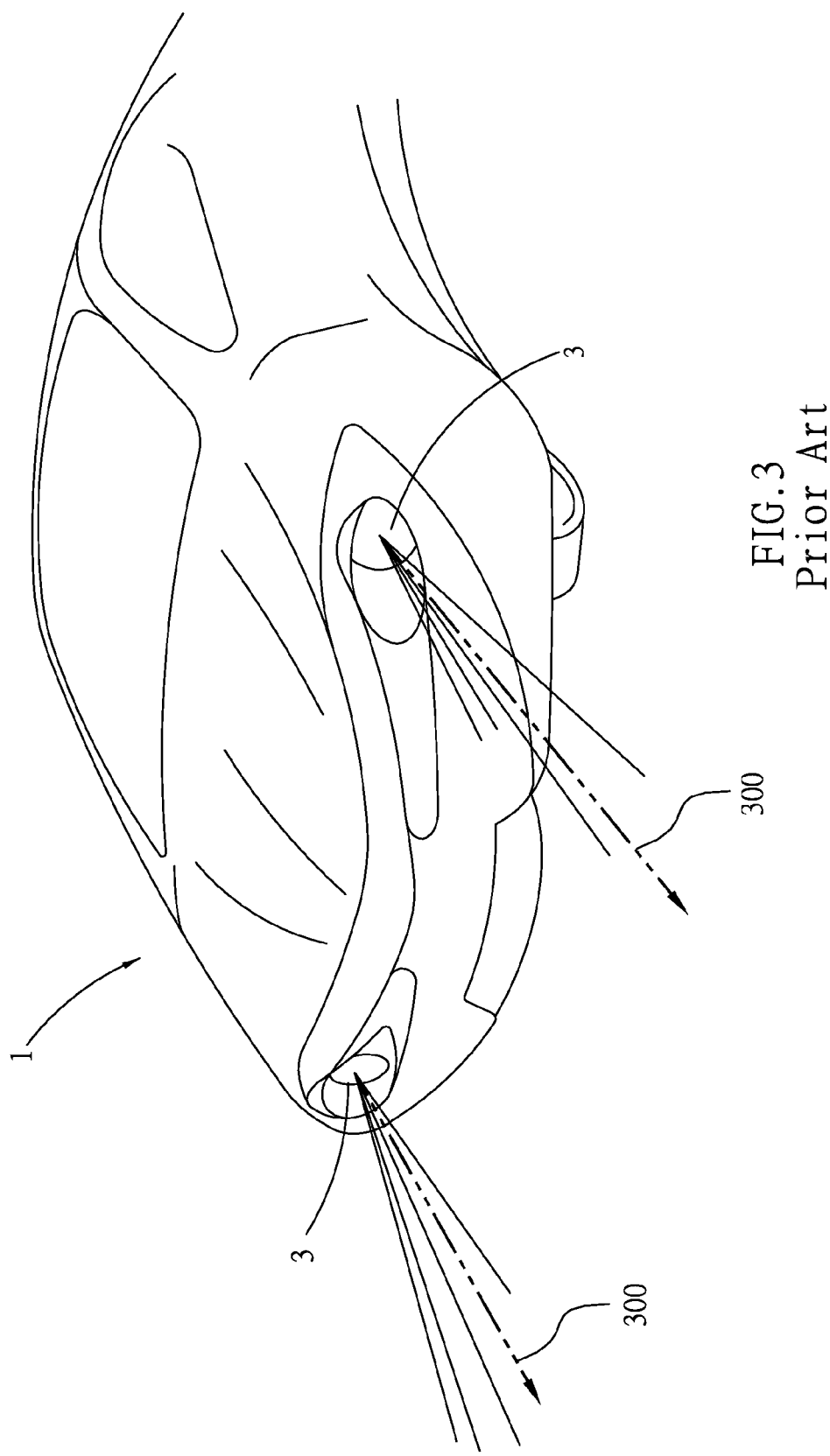
FIG. 3 is a diagram of a utilization state of another conventional handmade accessory assembled with a light emitting grain.
Figure 4:
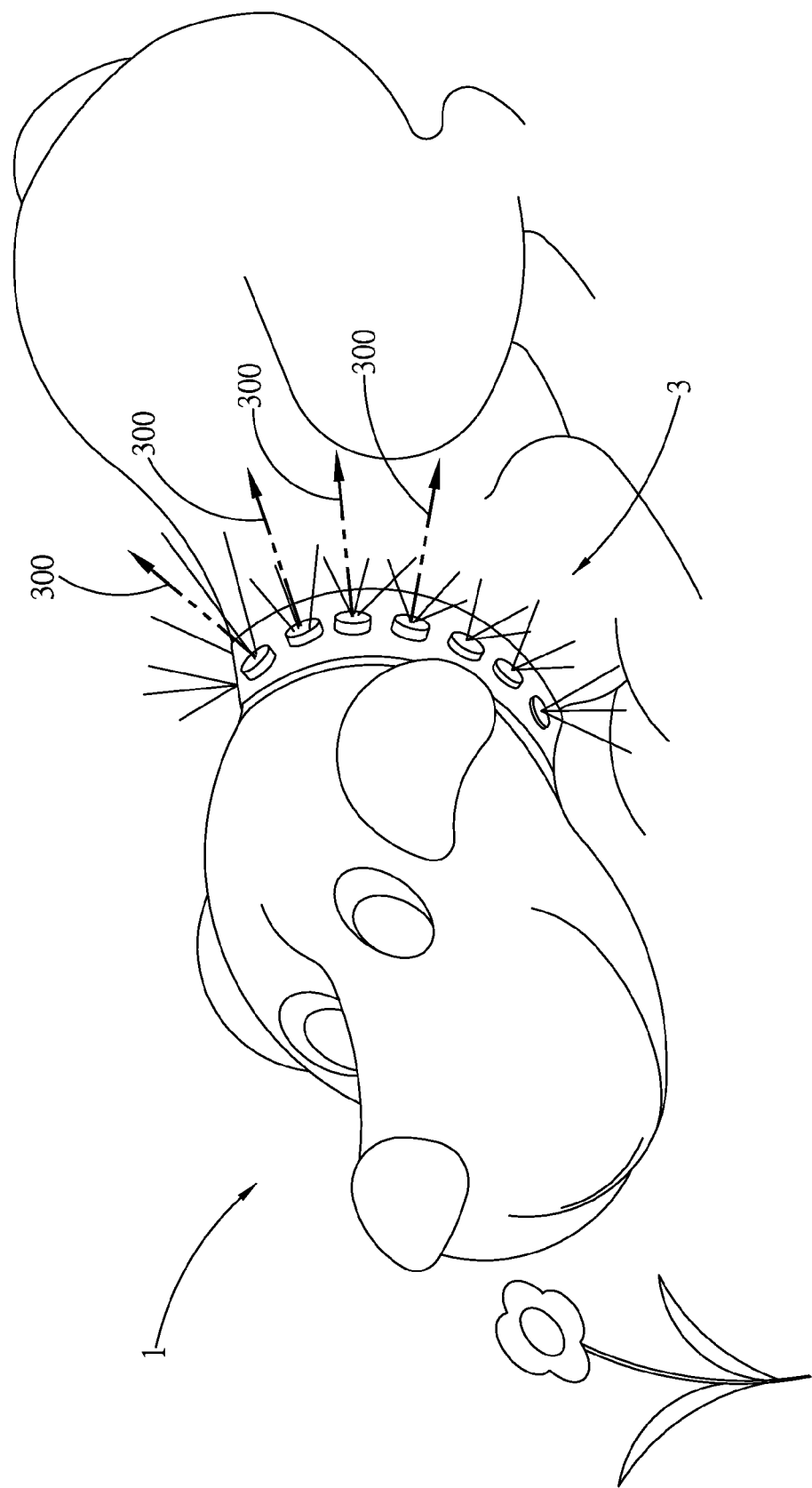
FIG. 4 is a diagram of a utilization state of another conventional handmade accessory assembled with a light emitting grain.
Figure 6:
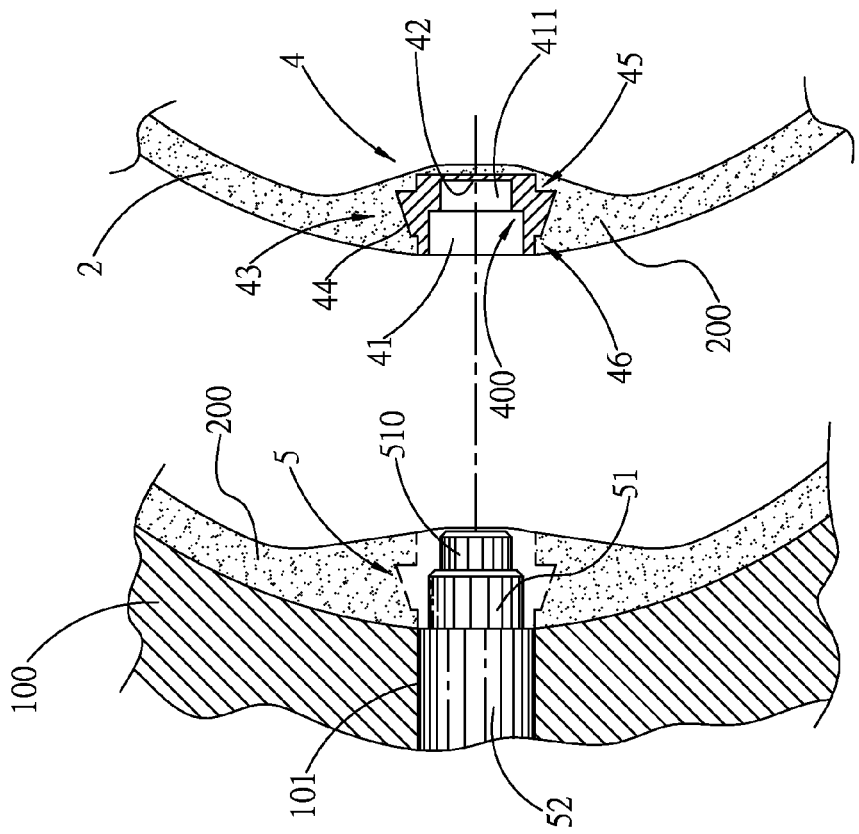
FIG. 6 is a diagram according to an embodiment of the present invention.
Figure 5:
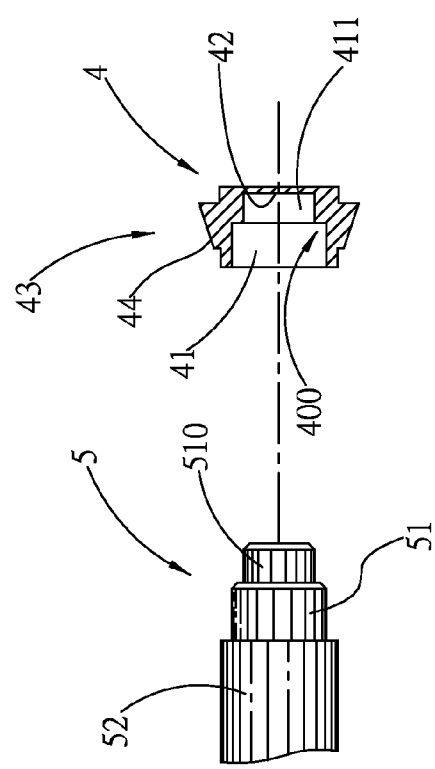
FIG. 5 is a structural relationship diagram of a positioning tenon and an adapter body of the present invention.
Figure 16:
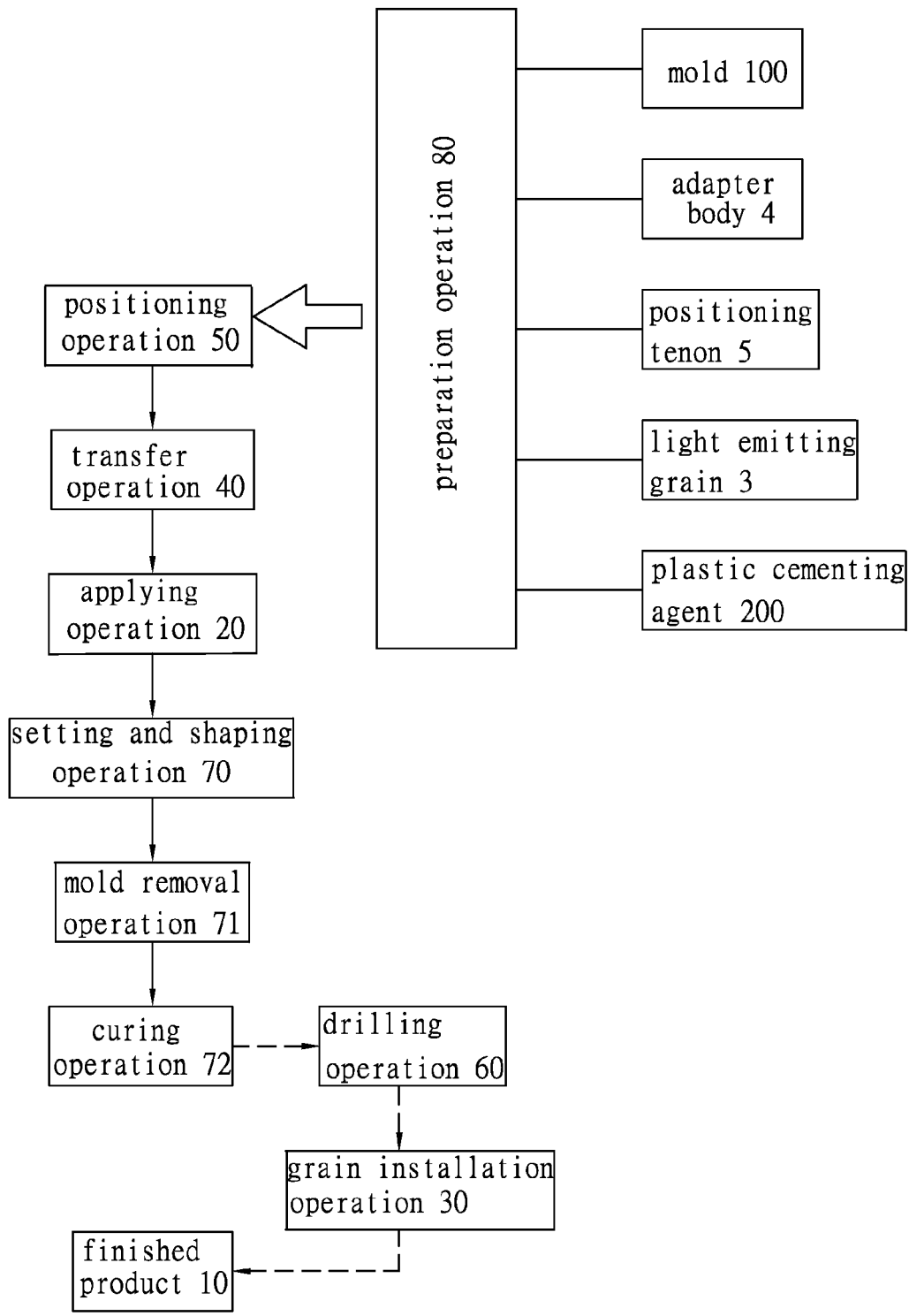
FIG. 16 is a flowchart of a manufacturing method of the present invention.

The description is given with reference to FIG. 16 first, followed by FIG. 5 and FIG. 6. In the manufacturing method of the present invention, a preparation operation 80 is first performed. The preparation operation 80 includes the configuration of a mold 100, and the completion of an adapter body 4, a positioning tenon 5, a light emitting grain 3 and a plastic cementing agent 200.

At a position for correspondingly installing the light emitting grain 3, a surface of the mold 100 is excavated to form a pick slot 101 having a depth. An angular direction of an axial arrangement of the pick slot 101 is determined according to an axial direction of the optical axis. The positioning tenon 5 is a cylindrical body, and includes a joining end 51 and a body 52. Preferably, a length of the body 52 is equal to the depth of the pick slot 101, and the joining end 51 has a reduced diameter. The adapter body 4 is a spherical body, has a height smaller than its overall diameter, and includes a transpose hole 41 penetrated through an axis of the adapter body 4. The transpose hole 41 passes by a shoulder 400 to be inwardly contracted to form a conducting hole 411. One end of the conducting hole 411 is sealed by an end sealing plate 42. The adapter body 4 corresponds to the positioning tenon 5. An outer end of joining end 51 of the positioning tenon 5 is reduced to form a guiding end 510, which is further accommodated in the conducting hole 411. The joining end 51 is accommodated in the transpose hole 41. After completing the shell-like housing 2, the shell-like housing 2 is physically connected to the adapter body 4 and is disengaged from the mold 100. The adapter body 4 is similarly disengaged from the positioning tenon 5.

A positioning operation 50 is performed after completing the preparation operation 80. The positioning tenon 5 is planted into the pick slot 101 of the mold 100, and the joining end 51 is revealed.

A transfer operation 40 is performed after completing the positioning operation 50. The transpose hole 41 of the adapter body 4 is aligned and assembled with the joining end 51. In principle, the height of the adapter body 4 in a cylindrical shape is smaller than the outer diameter of the adapter body 4. Further, the adapter body 4 includes the transpose hole 41 internally provided in an axial direction, the end sealing plate 42 at one end facing the exterior, and a radial fastening ring 43 surrounding an outer periphery of the adapter body 4. The radial fastening ring 43 and the adapter body 4 are a formed integral. The depth of the transpose hole 41 provided at the adapter body 4 is correspondingly designed to be equal to a length of the joining end 51 provided at the positioning tenon 5.

An applying operation 20 is then performed. The plastic cementing agent 200 is applied to an outer surface of the mold 100. During the applying operation 20, it is ensured that the plastic cementing agent 200 is closely and tightly applied to the outer periphery of the adapter body 4 in a surrounding manner. Thus, a breadth is distributed to a side of a breadth of the adapter body 4, and the plastic cementing agent 200 is all-around closely adhered to the side of the breadth of the adapter body 4, including the outer round surface of the radial fastening ring 43.

Further, the radial fastening ring 43 that surrounds a waist portion of the outer periphery the adapter body 4 is provided, and an outer periphery of the radial fastening ring 43 may be expanded to form a cone surface 44. As such, when the applied layer of the plastic cementing agent 200 is cured into the shell-like housing 2, with multi-angular pulling forces and a strong adhesion effect of the plastic cementing agent 200, the adapter body 4 becomes securely combined with the shell-like housing 2. A thickness of the applied layer of the plastic cementing agent 200 corresponds to a thickness requirement of the shell-like housing 2, and can be repeatedly applied to accumulate and form a handmade shell-like accessory.

Next, a setting and shaping operation 70 is performed. In the setting and shaping operation 70, the housing formed in collaboration with the applying operation may solidifies into a fundamental shape having a flexibility that satisfies the strength for mold removal. The plastic cementing agent 200 may be a plastic material, which may be implemented by a cold setting or hot setting material. A cold setting material solidifies under a room temperature. As for a hot setting material, by catalyzing reactions using a temperature, the setting of the hot setting material can be accelerated. Since the positioning tenon 5 is applied in a hot setting environment, the positioning tenon 5 and the adapter body 4 need to be implemented by a heat resistant material such as plastic steel.

A mold removal operation 71 is performed after the setting and shaping operation 70. The formed shell-like housing 2 is disengaged from the mold 100, and the positioning tenon 5 is removed.

A curing operation 72 follows the mold removal operation 71. In the curing operation 72, the shell-like housing 2 is exposed to air to reach a mechanical strength that meets relocation and placement requirements. The duration for the curing operation may be adjusted according to a response speed of the plastic cementing agent 200 of the shell-like housing 2, and may be between several hours to tens of hours, so as to allow an organization consolidation of the plastic cementing agent 200 to complete. Further, in the curing operation 72, both an inner side and an outer side of the shell-like housing 2 are exposed to be contact with air. Further, the surface of the shell-like housing 2 overlaps with an end surface of an opening of the transpose hole 41.

Figure 7:
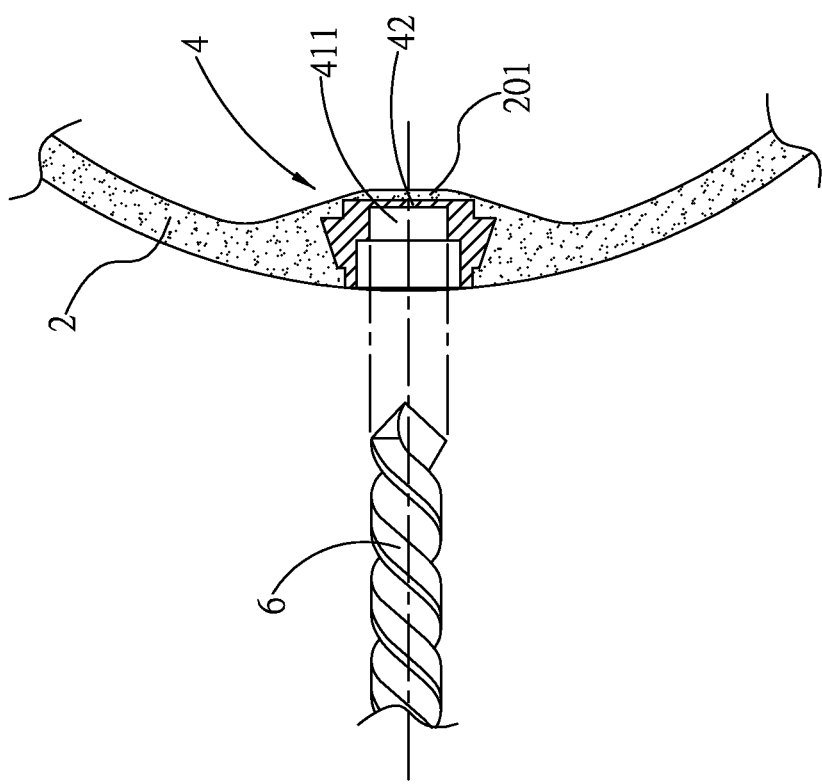
FIG. 7 is a schematic diagram of a guiding hole according to an embodiment of the present invention.

Refer to FIG. 7 and FIG. 8 showing a drilling operation 60. It should be noted that, one end of the conducting hole 411 is sealed by the end sealing plate 42, and an outer surface of the end sealing plate 42 is covered by a cladding layer 201 accumulated during the applying operation on the shell-like housing 2. Therefore, a drilling operation for a guiding hole is required to penetrate the center of the adapter body 4. During the drilling operation of the drill head 6, through the position of the conducting hole 411, a guiding direction of the guiding hole is obtained for alignment with a centerline of the adapter body 4, such that the guiding hole can be overlapped with the centerline of the adapter body 4 to penetrated the conducting hole 411 from front to rear.

Again referring to FIG. 8, by drilling the foregoing hole for the conducting hole 411, a through hole having a maximum diameter substantially equal to that of the conducting hole 411 is formed at the end sealing plate 42, and the adapter body 4 becomes axially penetrated.

A grain installation operation 30 is performed for the light emitting grain 3. The light emitting grain 3 is embedded and installed in the transpose opening 41. A combining portion 32 of the light emitting grain 3 has a diameter that cooperates with an activity tolerance of the transpose hole 41, and is a straight axis 323 having a rear end connected to an electrical wire 31. The shoulder 400 of the adapter body 4 is to be abutted against by an angular end 320 of the light emitting grain 3. By penetrating the electrical wire 31 through the internal axial channel in the adapter body 4, the combining portion 32 of the light emitting grain 3 is allowed to be combined at the transpose hole 41 (as shown in FIG. 9).

The combining portion 32 may be implemented in form of the straight axis 323, and is abutted against the shoulder 400 of the adapter body 4 after assembling the angular end 320 at the bottom to the adapter body 4. After the assembly operation, an adhesive may be filled to a gap between the transpose hole 41 of the adapter body 4 and an outer round surface of the light emitting grain 3 to physically combine the light emitting grain 3 and the adapter body 4. Thus, the optical axis of the light emitting grain 3 is secured to be overlapped with the axis of the adapter body 4, in a way that the angular position of the optical axis can be standardized and positioned. Thus, for every manufactured product, the optical axis of each light emitting grain 3 can be provided with an expected illumination angular position. Further, between the adapter body 4 and the shell-like housing 2, the outer round surface of the adapter body 4 is covered by the plastic cementing agent 200 of the shell-like housing 2. At one end surface of the end sealing plate 42, a cladding layer 201 is simultaneously formed during the applying operation of the plastic cementing agent 200 on the shell-like housing 2. The cladding layer 201 covers an opposite end surface of the adapter body 4 (except for the part that is drilled in the drilling operation).

The adapter body 4 is a spherical body or a circular ring body, and has an outer surface provided with the radial fastening ring 43 to form a multi-tier combination with the shell-like housing 2 to further form three-dimensional angular positioning effects. After assembling the light emitting grain 3, an adhesion operation is conducted to indirectly provide the light emitting grain 3 with a physical connection between the adapter body 4 and the shell-like housing 2. Further, the combining and contact area is expanded using the periphery of the adapter body 4 to significantly increase the mechanical binding force.

Figure 10:
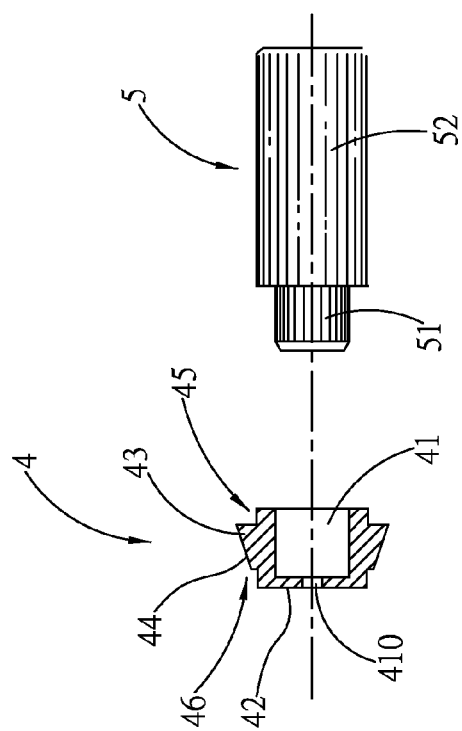
FIG. 10 is a diagram of a positioning tenon and an adapter body according to another embodiment of the present invention.

In another embodiment of the present invention, at a waist portion, the light emitting grain is provided with a block ring to limit an assembly depth. As shown in FIG. 10, the positioning tenon 5 includes a joining end 51 and a body 52. A diameter of the joining end 51 is reduced. The adapter body 4 in principle has a height smaller than an outer diameter thereof, and includes a transpose hole 41 internally provided in an axial direction, an end sealing plate 42 at one end facing the exterior, and a radial fastening ring 43 surrounding an outer periphery of the adapter body 4 in a radial manner. A center of the end sealing plate 42 is provided with an opening 410.

Figure 11:
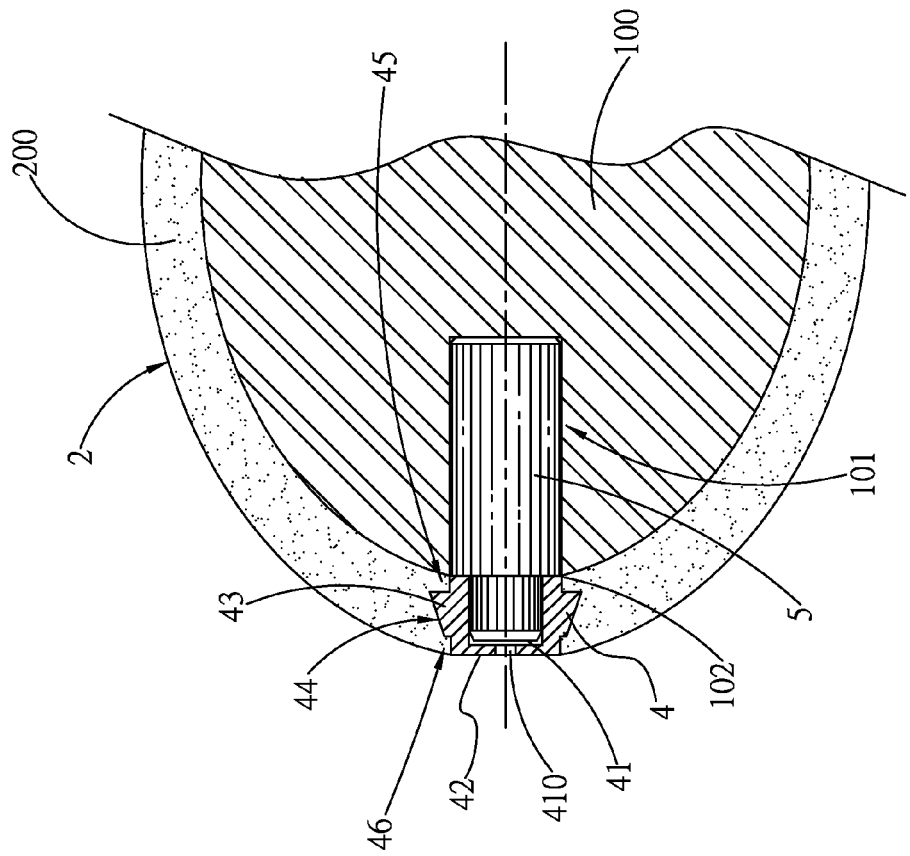
FIG. 11 is a side view after having completed an applying operation of the present invention.

In one embodiment, as shown in FIG. 11, the positioning tenon 5 may be planted into a pick slot 101 at a mold 100 through a positioning operation 50, and the transpose hole 41 provided at the adapter body 4 is transferred and combined at the joining end 51 of the positioning tenon 5 by a transfer operation 40.

In an applying operation 20, a plastic cementing agent 200 is similarly applied to an outer surface of the mold 100, and a setting and shaping operation 70 follows the applying operation 20.

Figure 12:
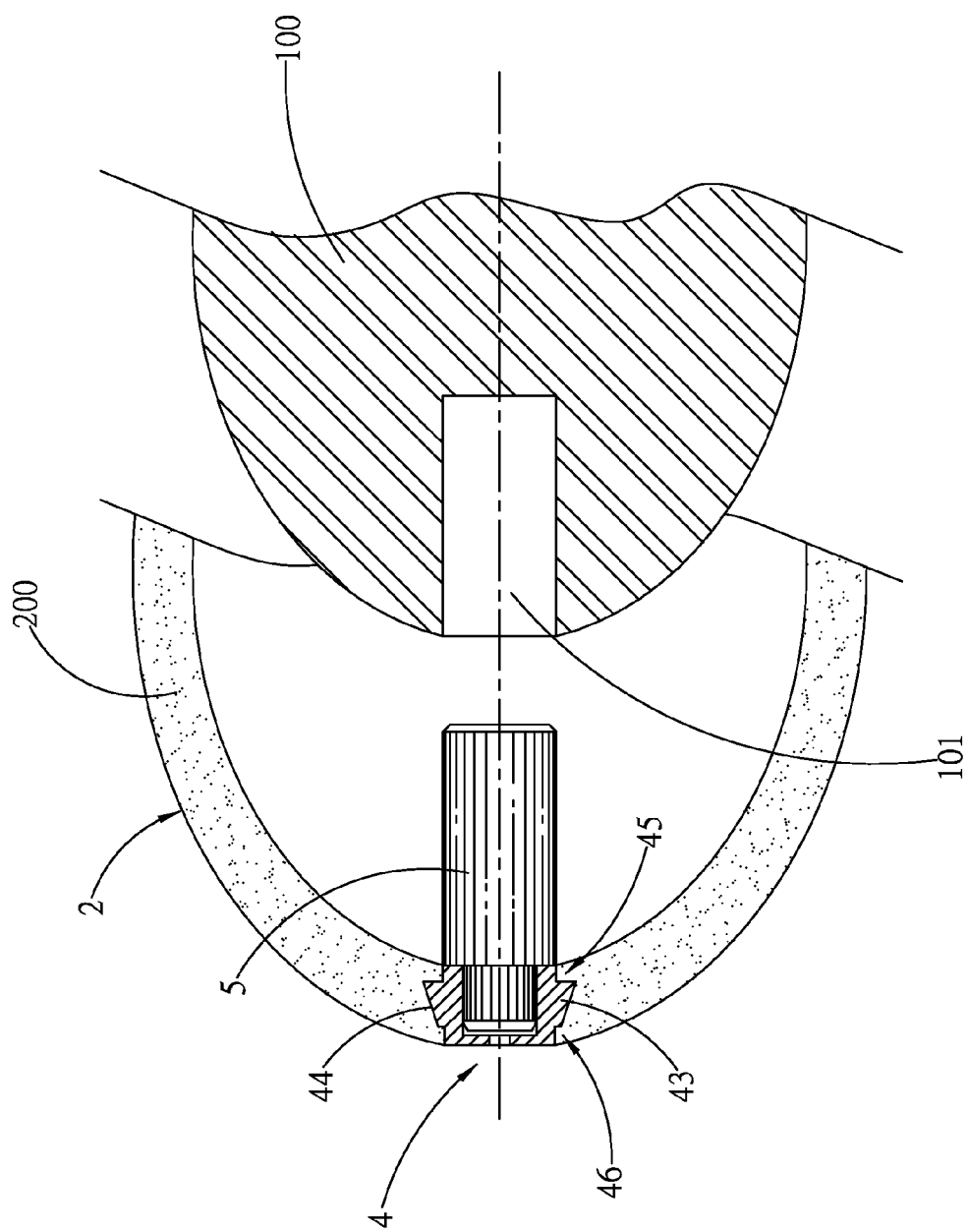
FIG. 12 is a schematic diagram of operations of a mold removal operation of the present invention.

After an element organization of the plastic cementing agent 200 reaches the time for setting and shaping, a mold removal operation 71 is performed, as shown in FIG. 12. The mold removal operation 71 is performed along an axial line of the pick slot 101 to disengage the positioning tenon 5 from the adapter body 4.

A curing operation 72 is performed after the mold removal operation 71. In the curing operation 72, the plastic cementing agent 200 of the shell-like housing 2 is allowed to completely solidify.

With the curing effects of the curing operation 72, an adhesive force of the plastic cementing agent 200 is provided between an outer round surface of the adapter body 4 and the plastic cementing agent 200 of the shell-like housing 2 to provide an effective binding force that achieves a reliable three-dimensional combination.

Figure 13:
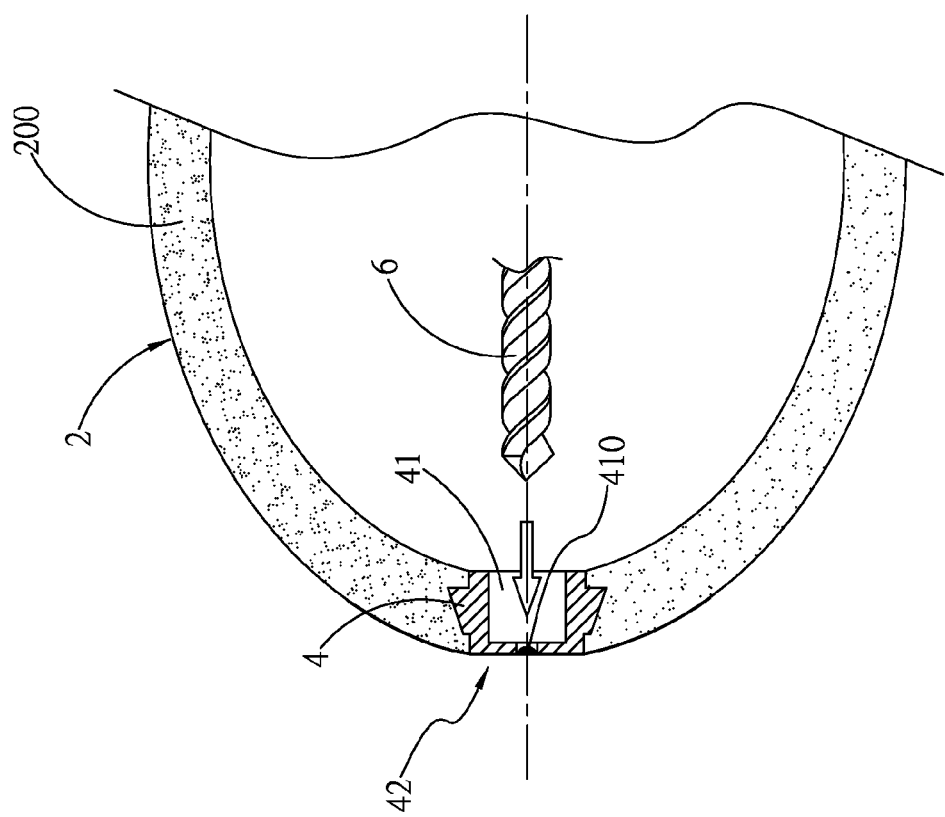
FIG. 13 is a schematic diagram of a drilling operation of the present invention.
Figure 14:
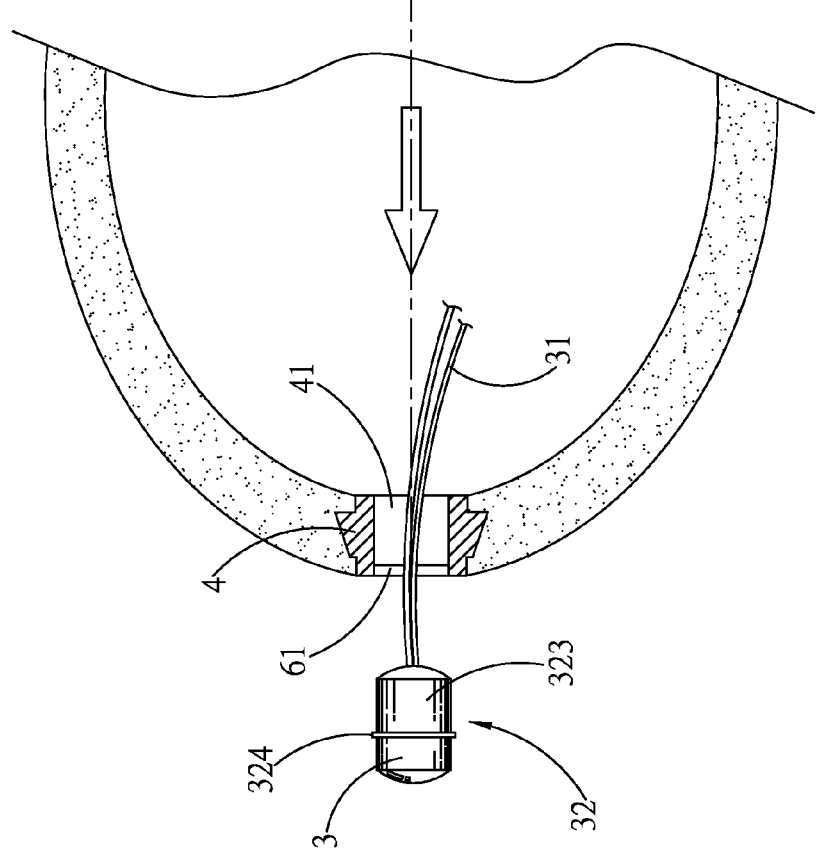
FIG. 14 is a diagram of a light emitting grain combined according to an embodiment of the present invention.

As shown in FIG. 13, a drilling operation 60 is performed. The drilling operation 60 is performed by aligning a working axial line of a drill head 6 with an axial line of the transpose hole 41 of the adapter body 4 to obtain a drill hole 61 as shown in FIG. 14. The drill hole 61 distinctly conducts the transpose hole 41 to an exterior.

Figure 15:
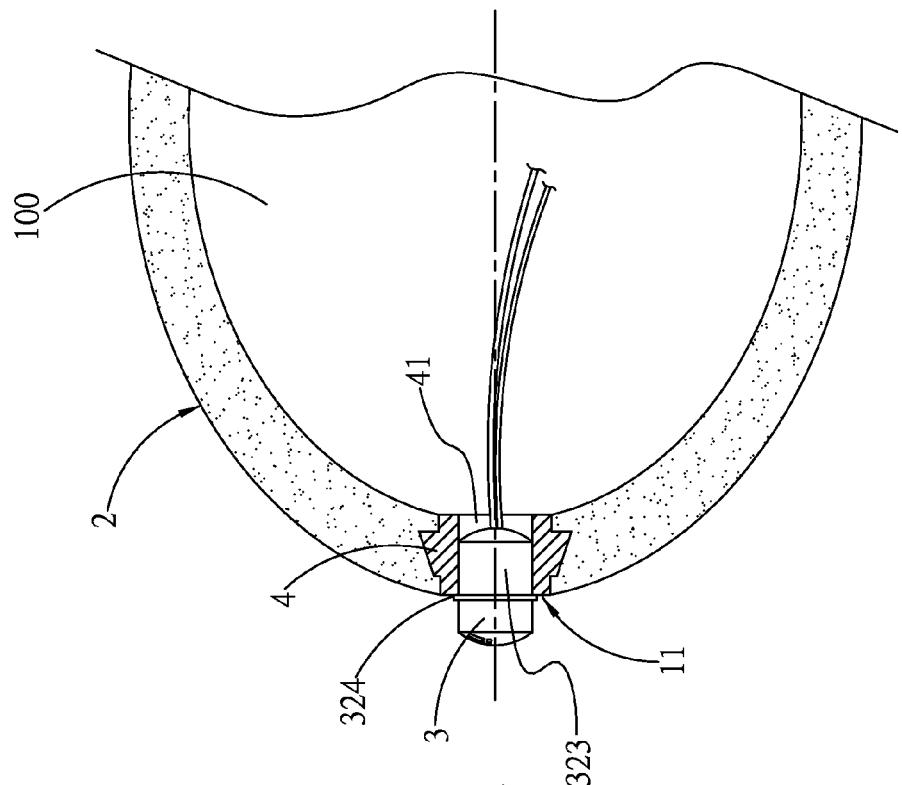
FIG. 15 is a schematic diagram of an assembly relationship of FIG. 14.

In the drilling operation 60 for the drill hole 61, a diameter of the drill hole 61 is designed to be equal to a diameter of the transpose hole 41 of the adapter body 4 (as shown in FIG. 15). Such drill hole 61 having an equal diameter may be implemented by a straight axis 323 of the light emitting grain 3 having a block ring 324 at an outer waist portion. A penetrated diameter of the straight axis 323 may coordinate with the transferred transpose hole 41. The overall outer body of the straight axis 323 is limited by the position and depth of the block ring 324, and is supported and combined by a long inner hole of the transpose hole 41. Further, an adhesive 11 may be applied to a gap between the two. Thus, an angular position of the optical axis of the light emitting grain 3 is limited by the centerline of the of the transpose hole 41 to provide a strong combining effect.

While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A manufacturing method for a securing structure for a light emitting element at a surface of a shell-like housing comprising steps of:
   a) a preparation operation of providing:
      at least one light emitting grain, having a rear end as a combining portion and backwardly extended to an electrical wire;
      a plastic cementing agent;
      at least one spherical adapter body, including an internal transpose hole provided along an axial direction, an end sealing plate at one end facing an exterior, and a radial fastening ring surrounding an outer periphery thereof;
      at least one circular rod-shaped positioning tenon, including one end as a body and one other end as a joining end having a reduced diameter, a length of the joining end being equal to a depth of the transpose hole;
      a mold, corresponding to a position of the light emitting grain to be installed at a surface of the accessory, including an excavated pick slot, a depth of the pick slot being equal to a length of the body of positioning tenon;
   b) a positioning operation of pivotally placing the body of the positioning tenon at the pick slot of the mold and leaving the joining end revealed;

c) a transfer operation of accommodating the transpose hole of the adapter body at the revealed joining end;
d) an applying operation of applying the plastic cementing agent to an outer surface of an accessory to be implemented with the mold, and firmly extending the plastic cementing agent around an outer periphery of the adapter body, including a surface of the radial fastening ring, a thickness of an applied layer being formed by repeatedly applying the plastic cementing agent to accumulate a desired thickness of the shell-like housing;
e) a setting and shaping operation of awaiting for an organization of the plastic cementing agent to combine into a set form;
f) a mold removal operation of exiting the mold and taking out the positioning tenon;
g) a curing operation, during which an inner surface and an outer surface of the shell-like housing are exposed;
h) a drilling operation for distinctly conducting the transpose hole of the adapter body to an exterior; and
i) a grain installation operation of penetrating the electrical wire of the light emitting grain in the shell-like housing and the transpose hole of the adapter body, and combining the combining portion of the light emitting grain at the transpose hole of the adapter body to form a finished product.

2. The manufacturing method for a securing structure for a light emitting element at a surface of a shell-like housing according to claim 1, wherein the transpose hole of the adapter body coaxially passes by a shoulder and has an inner diameter reduced to form a conducting hole; the conducting hole has an outer end sealed by an end sealing plate; the end sealing plate is penetrated through by a drilling operation, and has an opening with a maximum diameter that is equal to a diameter of the conducting hole.

3. The manufacturing method for a securing structure for a light emitting element at a surface of a shell-like housing according to claim 1, wherein in the grain installation operation, an adhesive is filled to an assembly gap between the combining portion of the light emitting grain and the adapter body to provide an overall securing and combining effect.

4. A securing structure of a light emitting element at a surface of a shell-like accessory, particularly a handmade shell-like accessory, for installing the light emitting element on the surface of the shell-like accessory, the securing structure comprising:
a spherical adapter body, including a radial fastening ring surrounding an outer periphery thereof, and an internal transpose hole provided along an axial direction, the transpose hole coaxially passing by a shoulder to conduct to a conducting hole that is in a front-rear penetrated arrangement;
a shell-like housing, including a breadth distributed to a breadth side of the adapter body, and a plastic cementing agent completely and closely adhered to the breadth side of the adapter body, including an outer surface of the radial fastening ring; and
a light emitting grain, having a rear end as a combining portion and backwardly extended to an electrical wire; after penetrating the electrically wire through the conducting hole of the adapter body, an angular end of the combining portion abutting against the shoulder and combined at the adapter body through an adhesive;
wherein, after assembly, an angular position of an optical axis of the light emitting grain is secured by the adapter body, and a combining area is indirectly expanded through a transfer effect of the adapter body to enhance a mechanical binding force between the light emitting grain and the shell-like housing.

5. The securing structure of a light emitting element at a surface of a shell-like accessory 4, wherein a height of the adapter body is smaller than an overall diameter of the adapter body.

* * * * *